June 19, 1934.   S. L. BROWN   1,963,776
DUPLEX POWER PLANT
Filed Nov. 8, 1933
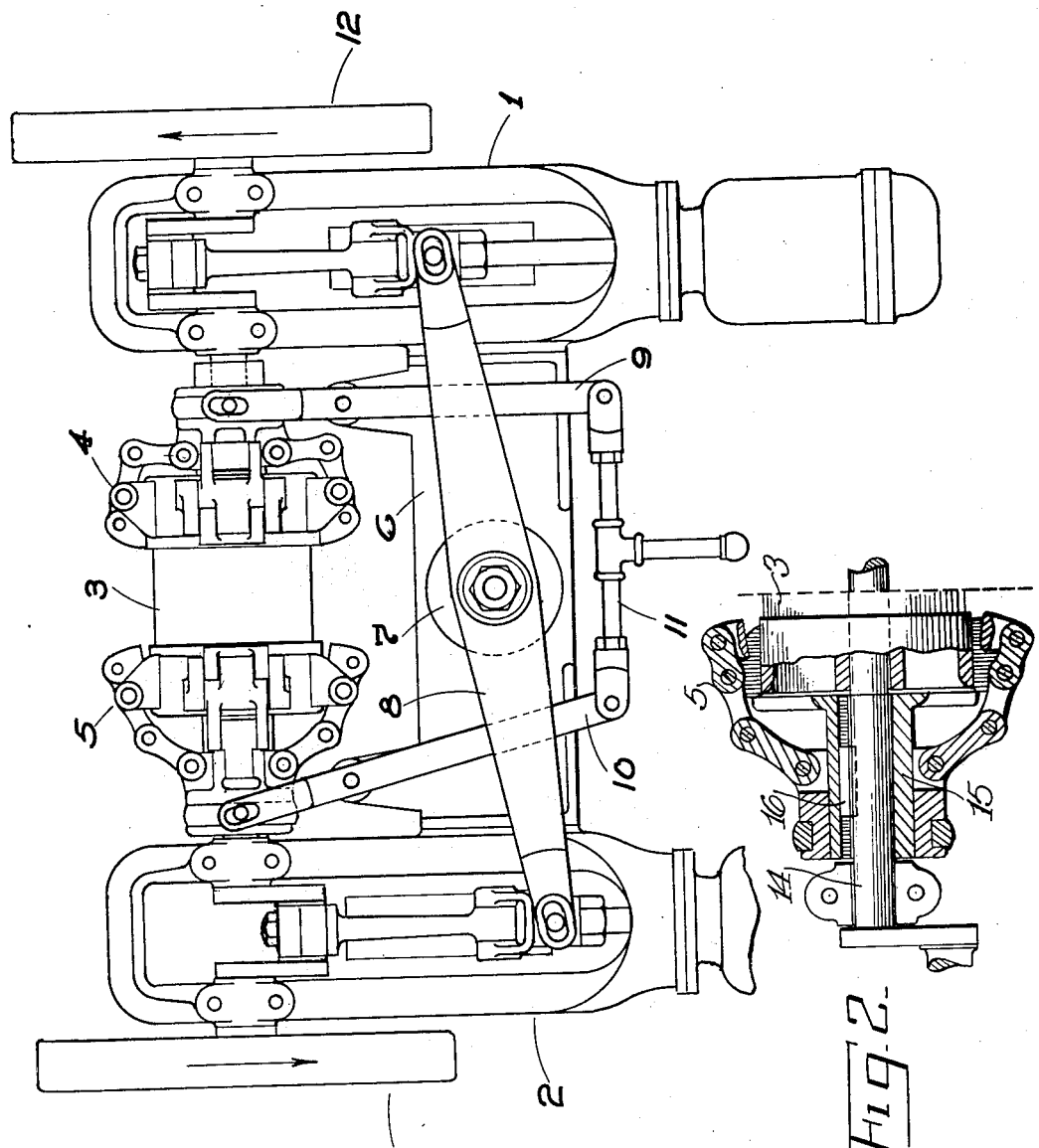

Patented June 19, 1934

1,963,776

UNITED STATES PATENT OFFICE 1,963,776

DUPLEX POWER PLANT

Stephen L. Brown, Franklin, Pa.

Application November 8, 1933, Serial No. 697,131

2 Claims. (Cl. 60—97)

This invention relates to a duplex power plant consisting of two internal combustion engines which are spaced in lateral relation to each other with their crank shafts in axial alignment, upon the adjacent ends of which shafts a power-transmitting pulley is mounted. Upon each of said shafts at the adjacent ends of said pulley, respectively, a clutch mechanism is keyed thereto; these clutch mechanisms are so constructed and adapted that either one thereof may be selectively engaged with the adjacent end of said pulley to drive same. The engines run in opposite directions and are provided with a cross actuation lever which is connected at its ends respectively, to the cross head of one of said engines; this cross actuation lever is pivoted at its center and is otherwise so arranged and operative, that the power of both engines may be transmitted to the crank of the engine which is operating the pulley. The crank of the disengaged engine and its disengaged clutch operate idly.

The particular object of this construction is, to avoid the use of a reverse clutch pulley in which the reverse motion is attained by means of gears and a brake mechanism, which gears are usually of either the spur-planetary or the bevel types or a combination of both.

The construction whereby I am enabled to attain said object is clearly illustrated in the drawing which forms a part of this specification, in which Fig. 1 is a general plan view of my improved duplex power plant.

Fig. 2 is a horizontal section through a portion of the left hand end of the power transmission pulley and the adjacent clutch mechanism showing this clutch in the disengaged position.

Referring to said drawing, the right hand engine is indicated by the numeral 1 and the left hand engine by the numeral 2; 3 is the power transmission pulley; the right hand clutch mechanism is indicated by the numeral 4 and the left hand clutch mechanism is indicated by the numeral 5; the engines are connected together by means of a distance piece 6, which carries a vertically extending supporting column 7 for the cross-actuation lever 8; the right hand clutch is provided with an actuation lever 9 and the left hand clutch is supplied with an actuation lever 10; these levers are connected together at their outer ends by means of a manually actuable reach 11.

The engines are intended to run in the direction of the arrows upon the respective flywheels 12 and 13.

Any suitable type of clutch may be employed, such as a jaw clutch, as shown, or a multiple disk clutch as well as various other types.

The left hand section of the crank shaft is indicated by the numeral 14, to which the clutch sleeve 15 is keyed by means of the key 16. The pulley 3 is normally free to rotate upon the crank shafts, and may be selectively engaged by and/or disengaged from either clutch mechanism, 4 or 5, by means of the reach 11; by placing said reach in the intermediate position, both clutches become disengaged and the pulley 3 is inoperative.

I claim the following:

1. A duplex power plant consisting of the combination of two laterally-spaced, rigidly connected engines with their crankshafts in axial alignment, said engines being adapted to run in opposite directions and having the adjacent ends of their respective crankshafts in close proximity to each other; a power transmission pulley loosely mounted upon said shafts, a clutch mechanism keyed to each of said shafts in clutching relation to the respective ends of said pulley, actuating mechanism whereby one of said clutch mechanisms may be engaged and the other of said mechanisms simultaneously released, and a cross-actuation lever whereby the power of each engine is transmitted to the crank shaft of the other, as and for the purpose set forth.

2. A duplex power plant consisting of the combination of two laterally spaced engines having their beds rigidly connected together and their crankshafts arranged in axial alignment, the adjacent ends of said shafts being in contiguous relation, said engines being arranged to run in opposite directions, a power pulley loosely mounted upon said shafts adjacent ends of said shafts, a clutch mechanism mounted upon and keyed to each of said shafts in clutching relation respectively to the associated end of said pulley, actuating means for said clutch mechanism whereby one of them is engaged and the other one is simultaneously disengaged, and a cross-actuation means for and connecting the operative portions of said engines so as to cause the combined power of both to be delivered by either of said clutch mechanisms and by the pulley driven thereby.

STEPHEN L. BROWN.